May 9, 1967     H. LIST     3,317,959
METHOD OF EXTRUDING MOLDABLE MATERIAL AND SCREW TYPE EXTRUDER
Filed Oct. 10, 1963
Fig. 1
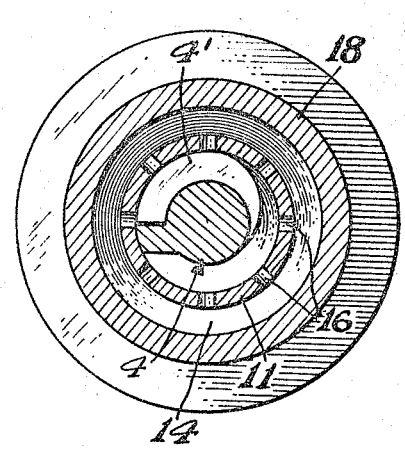
Fig. 2
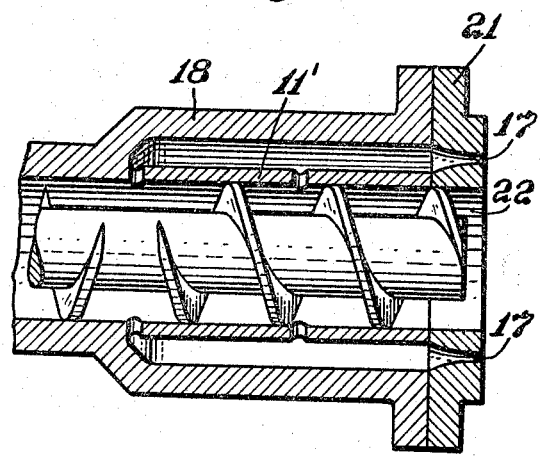
Fig. 3
INVENTOR.
Heinz List
BY Richard Low
Agt

United States Patent Office 3,317,959
Patented May 9, 1967

3,317,959
METHOD OF EXTRUDING MOLDABLE MATERIAL AND SCREW TYPE EXTRUDER
Heinz List, St. Jakobstrasse 43, Pratteln, Switzerland
Filed Oct. 10, 1963, Ser. No. 315,198
Claims priority, application Switzerland, Oct. 12, 1962, 11,990/62
8 Claims. (Cl. 18—12)

The present invention relates to a method of extruding moldable material and to a screw type extruder. The housing of the extruder has mounted therein a rotating and simultaneously oscillating screw which is formed with two sets of worm threads. A portion of the housing at one end thereof is referred to as discharge portion.

Worm machines or extruders for mixing, kneading and extrusion are known which possess a rotating and simultaneously oscillating worm or screw. The disadvantage of such worm machines consists in that, due to the oscillating movement of the worm and the oscillating discharge pressure involved therewith, the emergence of material fluctuates in dependence from reciprocating motion.

For this reason one was compelled to provide an additional arrangement at the outlet of the worm, for example, a normal extruder, in order to achieve continuous ejection. It has further been proposed to form the discharge end of the worm as a counter-worm and thus to cause worked-upon material, for example, synthetic plastic or other kneadable masses, to issue radially in a region between the normal or main worm and the counter-worm so that uniform ejection can be achieved. However, such a device has the disadvantage that sensitive material decomposes in the area of the counter-worm due to a long stay there and thus harms the issuing material. Furthermore, radially issuing material can be used only for granulation but cannot be given any profile.

The primary object of the invention is to provide a method and a discharge arrangement to overcome the stated disadvantages.

The method according to my invention uses a screw type extruder which includes a housing, a screw or worm rotatably mounted therein, and jacket means. The discharge portion of the housing has a free end and is provided with at least radially opening apertures. The jacket means surround spacedly the discharge portion and define together with the discharge portion at least a single chamber. The method comprises the steps of placing material that is being extruded in a region spaced from said free end under pressure, urging material from the interior of the discharge portion into the referred to chamber through such of said apertures as are near said region, axially deflecting material within the chamber in the direction toward the free end, recycling deflected material from the chamber into the interior of the discharge portion, and causing recycled material to move back to the aforesaid region. My method makes it possible for the material to be continuously renewed in the environs of a counter-worm or end portion of the screw so that no decomposition of the material can take place. The material conveyed by the worm is more expediently fed to the chamber referred to hereinbefore, which constitutes a secondary pressure chamber.

The axial deflection of the material permits the material to be withdrawn centrally through a nozzle opening and worked further, for example, by profiling or granulation.

The screw type extruder of the invention comprises a housing having a discharge portion that is provided with at least radially opening apertures, a screw rotatably and oscillatingly mounted within said housing and including a main portion and an end portion, and jacket means. The main portion of the screw has helical threads for conveying material toward the end portion of the screw, and the screw end portion has helical threads for conveying material in opposite direction toward the screw main portion. The jacket means surround spacedly the discharge portion and define therewith at least a single chamber, and the interior of the discharge portion communicates with the chamber by means of the aforesaid radial apertures.

The invention will now be further explained with reference to two embodiments thereof which are represented in the accompanying drawing wherein:

FIG. 1 shows a fragmentary axial section through a screw type extruder embodying features of the invention;

FIG. 2 shows a cross-section along the line A–B of FIG. 1; and

FIG. 3 shows modifications of discharge portion, screw end portion, and jacket means.

In the drawing, the portion of the extruder, shown in FIGS. 1 and 2, possesses a housing H in which there is arranged a rotating and simultaneously oscillating worm S. The housing consists of a main portion 1 and other portions which will be described hereinafter. The worm consists of a main portion 2 and an end portion 4 at the discharge end of the extruder. The main portion of the worm consists of a section 2 and a section 2a, the latter being narrower than the former. Both the section 2 and the section 2a have a set of helical threads 2' and 2a', respectively, each of these sets being adapted to convey material toward the end portion 4. The end portion 4 has a set of helical threads 4' adapted to convey material toward the main portion and, thus, forms what is referred to as a counter-worm. The section 2a of the worm S, together with its threads 2a', and the counter-worm 4, 4' are enclosed by a body 10 which includes a wall 11 that constitutes the discharge portion of the housing H and is coextensive with the screw end portion 4, 4'. The body 10 includes further a jacket 18 which surrounds spacedly the wall or discharge portion 11, and a portion 10' intermediate the housing portion 1 and the discharge portion 11 or jacket 18. The portion 10' and the wall or discharge portion 11 are narrower than the housing portion 1. The wall 11 is provided with radially opening apertures 13 and 16 and with an axial opening 19. The jacket 18 defines a pressure chamber 14 which communicates through the apertures 13 and 16 and the opening 19 with the interior 12 of the worm housing. The pressure chamber 14 is closed off in axial direction by a nozzle plate 15 which is secured to the jacket 18 and possesses a central discharge opening 20. It will be appreciated that portion 10' of the body 10, and the wall 11 are continuations of the housing portion 1 and parts of the screw-enclosing over-all housing H.

The section 2 of the worm S possesses continuous or interrupted helical threads which may be made to cooperate with kneading teeth (not shown) arranged on the inner wall of the housing portion 1. The screw section 2a is preferably equipped with continuous helical threads and forms a continuation of the screw section 2. The material is placed under pressure between worm and counter-worm and forced through the apertures 13 which are formed, for example, as round holes or as slots, to open into the chamber 14 that constitutes a secondary pressure chamber 14. In the chamber 14, the material is deflected in the axial direction. It should here be mentioned that the secondary pressure chamber can also consist of individual channels running in longitudinal direction. A part of the material when placed under pressure by the following material escapes through the opening 20 of the nozzle 15, and a part is fed through the apertures 16 and the opening 19 back to the counter-worm 4. The material moves within the wall or discharge portion 11 of the housing H of the extruder in a direction opposite to the delivery direction of the screw sections 2 and 2a to, and again through, the apertures 13 so that a constant renewal of the material in the environs of the counter-worm 4 is ensured. Thus, when working with sensitive synthetic plastic substances decomposition is prevented. The worms, wall and jacket can be brought to appropriate temperature in any known manner electrically, with steam or any other heat or cold carrier.

In FIG. 3 there is represented a further embodiment of the invention, which is especially suitable for granulation of plastic materials. In this embodiment, the jacket 18 is connected with a nozzle plate 21 which possesses bores 17 of nozzle form, extending in axial direction. The material issues through these bores in spaghetti form and is cut in known manner by a knife travelling closely past the nozzles. Under certain conditions the wall 11' and nozzle plate 21 may be fully open at 22 for better observation.

It is often helpful to provide at the discharge end of the extruder means for varying the cross-section of the apertures 13 and 16 in the walls 11 and 11' and for closing and opening these apertures to control the flow of material in circulation according to needs.

What I claim is:
1. A method of extruding moldable material, using a screw type extruder having a housing, a screw rotatably mounted therein, and jacket means, said housing including a discharge portion having a free end and being provided with at least radially opening apertures, said jacket means spacedly surrounding said discharge portion and defining therewith at least a single chamber,
   (1) placing material being extruded in a region spaced from said free end under pressure,
   (2) urging material from the interior of said discharge portion into said chamber through such of said apertures as are near said region,
   (3) axially deflecting material within said chamber in the direction toward said free end,
   (4) recycling material from said chamber into said interior, and
   (5) causing recycled material to move within said chamber back toward said region.

2. A screw type extruder comprising
   (1) a housing having
      (a) a discharge portion provided with radially opening apertures and at least a single axially extending opening,
   (2) a screw rotatably and oscillatingly mounted within said housing and including
      (a) a main portion and
      (b) an end portion, said main portion having helical threads adapted to convey material toward said end portion, said end portion having helical threads adapted to convey material toward said main portion, and
   (3) jacket means spacedly surrounding said discharge portion and defining therewith at least a single chamber, the interior of said discharge portion communicating with said chamber.

3. In the extruder according to claim 2, said housing including, in addition to said discharge portion, a main portion and a portion intermediate said main portion and said discharge portion, said intermediate and discharge portions being narrower than said main portion.

4. In the extruder according to claim 3, said screw main portion including a first and second section, said second section and said screw end portion being narrower than said first section, said second section being substantially coextensive with said intermediate housing portion.

5. A screw type extruder comprising
   (1) a housing having
      (a) a discharge portion having a free end and being provided with at least radially opening apertures,
   (2) jacket means spacedly surrounding said discharge portion and defining therewith at least a single chamber, the interior of said discharge portion communicating with said chamber by means of said radial apertures, and
   (3) a screw rotatably and oscillatingly mounted within said housing and including
      (a) a main portion and
      (b) an end portion, said main portion having helical threads adapted to convey material toward said end portion, said end portion having helical threads adapted to convey such material toward said main portion as is urged from said discharge portion through said radial openings into said chamber, and is then recycled into said discharge portion.

6. In the extruder according to claim 5, said jacket means being provided with at least a single discharging opening.

7. In the extruder according to claim 5, said end portion being substantially coextensive with said discharge portion.

8. A screw type extruder comprising
   (1) a housing having
      (a) a discharge portion provided with at least radially opening apertures,
   (2) a screw rotatably and oscillatingly mounted within said housing and including
      (a) a main portion and
      (b) an end portion, said main portion having helical threads adapted to convey material toward said end portion, said end portion having helical threads adapted to convey material toward said main portion,
   (3) jacket means spacedly surrounding said discharge portion and defining therewith at least a single chamber, the interior of said discharge portion communicating with said chamber, and
   (4) a nozzle plate closing said chamber and being provided with outlet means.

References Cited by the Examiner

UNITED STATES PATENTS

| 2,410,035 | 10/1946 | Luaces | 18—12 |
| 2,422,480 | 6/1947 | Gordon | 18—12 |
| 2,948,922 | 8/1960 | Meskat et al. | 18—12 |
| 3,023,455 | 3/1962 | Geier et al. | |

FOREIGN PATENTS 1,092,186  11/1960  Germany.

WILLIAM J. STEPHENSON, *Primary Examiner.*

J. SPENCER OVERHOLSER, *Examiner.*

L. S. SQUIRES, *Assistant Examiner.*